A. HILDEBRANDT & W. E. MOFFETT.
CASTER.
APPLICATION FILED JUNE 5, 1915.

1,204,440.

Patented Nov. 14, 1916.

Inventors
Albert Hildebrandt
W. E. Moffett

Attorney

UNITED STATES PATENT OFFICE.

ALBERT HILDEBRANDT AND WILLIAM EDWIN MOFFETT, OF BALTIMORE, MARYLAND.

CASTER.

1,204,440.  Specification of Letters Patent.  Patented Nov. 14, 1916.

Application filed June 5, 1915. Serial No. 32,362.

*To all whom it may concern:*

Be it known that we, ALBERT HILDEBRANDT and WILLIAM EDWIN MOFFETT, citizens of the United States, residing at Baltimore and State of Maryland have invented certain new and useful Improvements in Casters, of which the following is a specification.

The caster which is the subject matter of the present application for patent is designed more particularly for use in connection with phonograph, Victrola or other talking-machine cabinets, the caster being adjustable as to height so that the cabinet may be set perfectly level on an uneven floor. The caster is also applicable to tables, desks, china-closets and other articles of furniture.

The invention has for its object to provide a novel and improved caster of the kind stated which is simple in construction, and which can be readily adjusted for the purpose stated.

In order that the invention may be better understood, reference is had to the accompanying drawing in which—

Figure 1:
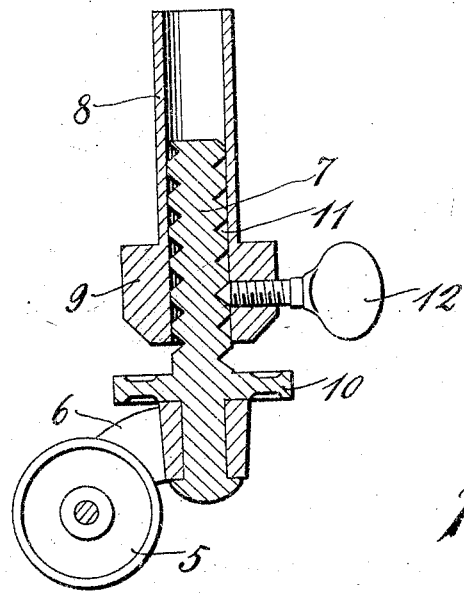
Figure 2:
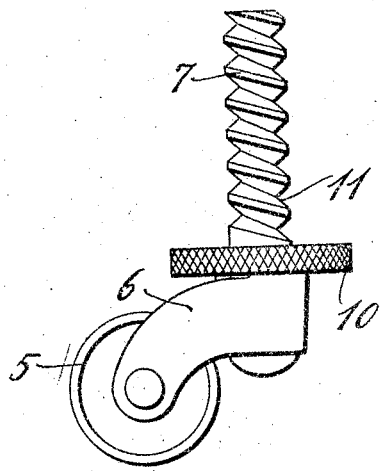

Figure 1 is a vertical section of the device, and Fig. 2 is an elevation thereof.

Referring specifically to the drawing, 5 denotes the roller of the caster carried by a bracket 6 swiveled on the lower end of a spindle 7 as in an ordinary roller-caster. It may be here stated that the invention is not limited to a roller-caster, but may, with equal facility, be applied to any ordinary ball-caster.

The spindle 7 seats loosely at its upper end in a socket piece 8 which is fixed in the ordinary manner to the cabinet, furniture leg or other part to which the caster is applied. The lower end of the socket piece, above the bracket 6, has a head 9 which abuts against the bottom of the part to which the socket piece is fixed, and between this head and the flange, the spindle has a milled flange 10. That portion of the spindle which seats in the socket piece has an external, helical groove 11, and the head carries a transverse set screw 12 adapted to have its inner pointed end seat in the groove of the spindle. The socket piece is not threaded.

The caster is readily adjusted as to height to level the part to which it is attached, by turning the spindle 7, after backing the set screw 12 sufficiently to release the spindle. The flange 10 is provided for facilitating the turning of the spindle. The set screw is not entirely withdrawn from the groove 11 when making the adjustment, but remains therein, so that when the spindle is turned it is caused to travel in the direction of its length. After the adjustment is effected, the set screw is advanced until it firmly binds the spindle in the socket piece and prevents it from turning to disturb the adjustment.

We claim:—

A caster having a spindle provided with an external, helical groove, an unthreaded socket piece in which the spindle slidably and rotatably seats, and a set screw threaded transversely through the socket piece and having its inner end pointed and adapted to seat in the groove of the spindle.

In testimony whereof we affix our signatures in presence of two witnesses.

ALBERT HILDEBRANDT.
W. EDWIN MOFFETT.

Witnesses:
WILLIAM H. MOFFETT,
REGINALD R. MOFFETT.